United States Patent [19]

Tadokoro et al.

[11] 3,905,779

[45] Sept. 16, 1975

[54] MAGNETIC RECORDING BODY

[75] Inventors: Eiichi Tadokoro; Masashi Aonuma, both of Odawara, Japan

[73] Assignee: Fuji Photo Film Co., Ltd., Minami-Ashigara, Japan

[22] Filed: Nov. 16, 1973

[21] Appl. No.: 416,545

[30] Foreign Application Priority Data

Nov. 16, 1972 Japan .............................. 47-115371

[52] U.S. Cl. .............................................. 29/194
[51] Int. Cl.² .......................................... B32B 15/20
[58] Field of Search .................................... 29/194

[56] References Cited

UNITED STATES PATENTS 3,717,504 2/1973 Aonuma et al. .................... 117/239

*Primary Examiner*—L. Dewayne Rutledge
*Assistant Examiner*—E. L. Weise
*Attorney, Agent, or Firm*—Sughrue, Rothwell, Mion, Zinn & Macpeak

[57] ABSTRACT

A magnetic recording body, having excellent impact and wear resistance, which comprises a nonmagnetic support, a magnetic recording medium layer applied thereon and composed mainly of Co or a Co-Ni alloy, a first protecting layer of Cu having a thickness of less than 0.2$\mu$ and applied on the magnetic recording medium layer, and a second protecting layer of Rh having a thickness of more than 0.01$\mu$ and applied on the first protecting layer. In order to improve the magnetic properties of the magnetic recording body, Cu, Ag, Hg, or P can be added to the Co-Ni alloy of the magnetic recording medium layer.

8 Claims, 5 Drawing Figures

MAGNETIC RECORDING BODY

BACKGROUND OF THE INVENTION

1. Field of the Invention

This invention relates to a magnetic recording body for a magnetic recorder, and, more particularly, to a magnetic recording body including a magnetic recording medium plated layer and protecting layers applied thereon.

2. Description of the Prior Art

It is the usual practice to use a powder of $\gamma$-$Fe_2O_3$, $Fe_3O_4$ or like magnetic Fe oxides or alloys as a magnetic recording medium.

For special purposes, a magnetic recording medium of a plated magnetic metal can be used.

For example, magnetic discs, tapes and cards produced by magnetic metal plating are used for auxiliary date storage. The magnetic recording media are used under severe conditions and must be impact and abrasion resistant. The surface of the magnetic disc must not have the slightest scratches and irregularities, and must be completely hard and must have a mirror like surface smoothness.

If the disc surface is not smooth, the flying characteristics of the magnetic head is worsened and contact of the head and the disc is often broken. On the other hand, the flying head often touches the disc at the start of the flying period or dust collects between the head and the disc. The information recorded on the disc must not be damaged by such touching or impact. Accordingly, the wear and impact resistance of the magnetic recording medium are very important factors.

An electric plating process, a chemical plating process, a vacuum depositing process, a sputtering process and a gas spraying process can be employed for producing the magnetic recording medium layer. The severe impact or wear on the magnetic recording medium thus produced causes surface scratches or the peeling off of the magnetic recording medium layer from the support, and the recorded information is destroyed shortening the effective life of the magnetic disc.

In addition the surface of the plated magnetic recording medium layer, if exposed directly to the atmosphere, exhibits inferior resistance to atmospheric attack. Therefore, various attempts have been made to eliminate the above described defects in the magnetic recording medium, and many processes for producing a magnetic recording medium having excellent resistance to the atmospheric attack or many processes for applying a protecting layer or a lubricating agent on the surface of the magnetic recording medium have been proposed.

SUMMARY OF THE INVENTION

We, the inventors, have tried to solve the above problems of the prior art and, after many studies, have made this invention.

The magnetic recording medium of this invention comprises applying a first protecting layer of an extremely thin copper film on the surface of the plated magnetic recording medium layer by copper plating, and applying a second protecting layer of an extremely thin rhodium film further on the surface of the first protecting layer by plating.

BRIEF DESCRIPTION OF THE ACCOMPANYING DRAWINGS

Figure 2:
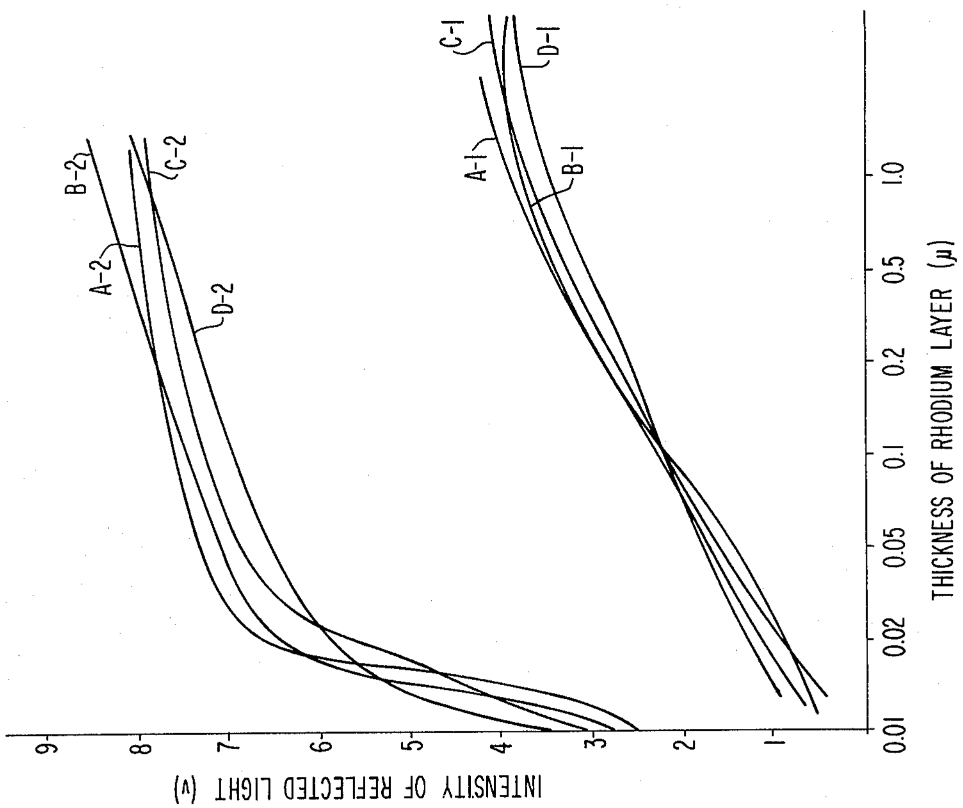
FIGS. 2 and 4 are graphs showing the relation between the intensity of reflected light (V) and the thickness of the rhodium layer.
Figure 5:
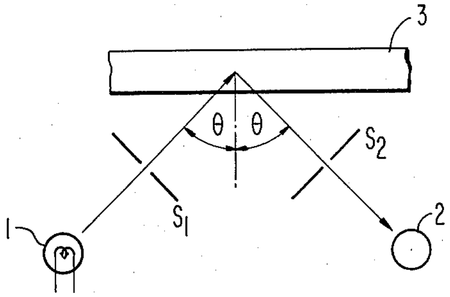
Figure 4:
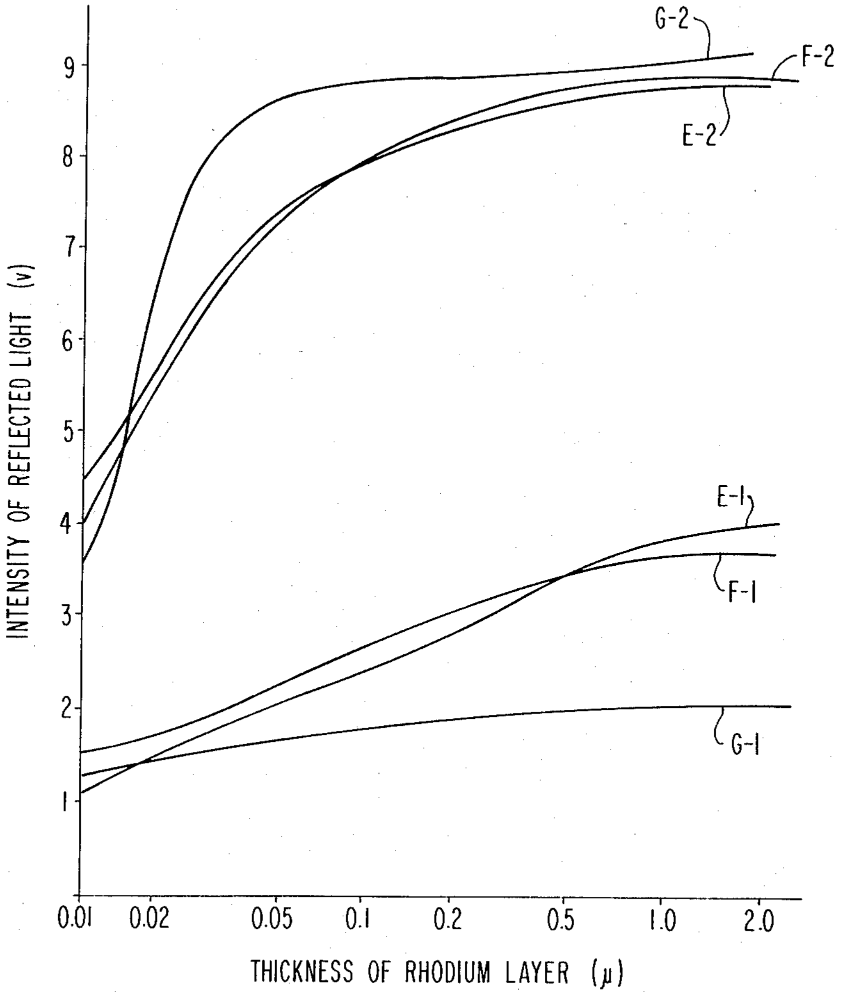

FIG. 5 shows the apparatus used in measuring the intensity of reflected light shown in FIGS. 2 and 4 in which 1 is a lamp or light source, 2 is a photoelectric cell, 3 is a sample, $S_1$ and $S_2$ are slits and $\theta$ is an angle of 45°. Light from lamp 1 is supplied through slit $S_1$ and strikes sample 3. The reflected light from sample 3 passes through slits $S_2$ and the strength of the light is measured by photoelectric cell 2.

DETAILED DESCRIPTION OF THE INVENTION

Generally, the protecting layer must be thin to retain favorable magnetic recording properties. That is to say, the space between the surface of the magnetic recording medium and the magnetic head is increased the thicker the protecting layer is thereby causing a space loss indicated by the following formula:

$$\text{space loss} = 54.6\ \frac{d}{\lambda} (db)$$

$d$ = the space between the surface of the magnetic recording medium and the magnetic head $\lambda$ = the recording wave length It can be understood from this formula that the space loss becomes great as the space increases or the recording wave length is shortened. In other word, the influence of the space on the magnetic properties is increased in high density recording, thus reducing the out put voltage and causing drop out. According to this invention, the thickness of the copper film first protecting layer is less than 0.2 $\mu$, preferably 0.01 – 0.2 $\mu$, and that of the rhodium film second protecting layer is more than 0.01 $\mu$, preferably 0.01 – 2 $\mu$, most preferably 0.1 – 0.3 $\mu$.

The surface of the magnetic recording medium is shiney bright and smooth. In addition, the plated magnetic recording medium obtained by providing the first and second protecting layers exhibits excellent magnetic properties, especially a high squareness ratio. Furthermore, the durability of the magnetic recording medium is greatly increased when effects of direct impact and wear on the magnetic recording medium is decreased by the protecting layers.

In addition to that, the existence of the rhodium film remarkably improves the durability, mechanical strength and wear resistance of the magnetic recording medium.

The features of this invention will be described in greater particularly:

The surface of the plated magnetic recording medium is made lustrous and smooth by providing thereon the first protecting layer of the lustrous copper film. The first protecting layer, especially when its thickness is not more than 0.2 $\mu$, favorably influences the magnetic properties of the magnetic recording medium. A more excellent luster, a mirror like smoothness and improved magnetic properties can be obtained by applying a second protecting layer of the rhodium film on the first protecting layer.

In addition, weather resistance, corrosion resistance, heat resistance and high hardness, which are inherent characteristics of the rhodium film, are advantageously utilized.

The advantageous weather resistance, wear resistance, corrosion resistance and high hardness properties of the recording material of the invention are demonstrated in the table below in which these properties are summarized for samples which contained only a copper protective layer, only a rhodium protective layer, or the copper protective first layer and the rhodium protective second layer of the invention.

| Plating layer | Cu | Rh | Cu/Rh |
|---|---|---|---|
| Weather Resistance | 1 | 0.04 | 0.02 |
| Wear Resistance | 1 | 0.03 | 0.01 |
| Corrosion Resistance | 1 | 0.04 | 0.02 |
| Hardness (kg/mm$^2$) | 140 | 440 | 520 |

The tests which were conducted are summarized below.

Weather Resistance: A sample of each of the above was prepared and each sample was left out doors for 100 days. The number of pinholes of diameters greater than 15 $\mu$ per centimeter was measured and the values obtained were expressed relatively using the sample containing only the copper layer as a standard.

Wear Resistance: The loss of the tape surface due to abrasion of each of the samples when a ferite head was contacted with the tape at a pressure of 500 g/cm$^2$ and with a tape running speed of 5 m/sec was measured. The results obtained are indicated relatively to the copper layer only sample as a standard.

Corrosion Resistance: Each of the samples was dipped into 0.1 N sulfuric acid for 10 min and the number of pinholes of diameters greater than 15 $\mu$ per centimeter was measured for each sample. The results obtained are expressed relatively using the sample containing the copper only layer as a standard.

Hardness: The Vickers hardness was measured for each of the samples.

The above results show the advantages of the use of the copper first protective layer and the rhodium second protective layer. It can be seen that advantageously the amount of rhodium, which is quite expensive, can be minimized by providing the first protecting layer of copper.

The preferred magnetic recording medium is composed mainly of cobalt or a cobalt-nickel alloy produced by plating in a thickness of 0.01 – 5 $\mu$, preferably 0.1 – 2 $\mu$. The magnetic recording layer can be the recording medium described, for example, in U.S. Pat. Nos. 3,150,939; 3,202,529 and 3,393,982. The most preferable magnetic recording medium is composed mainly of cobalt or a cobalt-nickel alloy and contains small amounts of copper, phosphorus, silver or mercury. A plating bath containing copper ions, silver ions, mercury ions and phosphorus ions in combination with cobalt ions or nickel ions is employed and by plating a magnetic layer as above described is obtained.

Suitable electro-plating conditions which can be used to produce the magnetic layer are a temperature of about 25° – 60°C, a bath pH of about 3.5 to 5.5, a current density of about 0.5 – 5.0 A/dm$^2$ and a plating rate of 0.15 – 0.25 $\mu$/min. Suitable conditions for electroless plating of the magnetic layer are a temperature of about 40° – 90°C, a bath pH of 7.5 – 9.5 and a plating rate of about 0.05 – 0.2 $\mu$/min.

In the copper layer plating, the electroplating conditions generally employed are a temperature of about 40° – 60°C, a bath pH of about 7.5 – 9.0, a current density of about 1 – 6 A/dm$^2$ and a plating rate of 0.1 – 0.3 $\mu$/min. In the rhodium layer plating, the electroplating conditions which are usually utilized are a temperature of about 25° – 60°C, a bath pH of less than 2, a current density of about 1 – 4 A/dm$^2$ and a plating rate of about 0.05 – 0.15 $\mu$/min.

The following examples of preferred embodiments of the present invention are given to explain the invention in greater detail.

Unless otherwise indicated, all parts and percents are by weight.

EXAMPLE 1

A magnetic recording medium was plated on a surface of a copper plated aluminum base sheet under the following conditions:

| | | |
|---|---|---|
| Composition of the Plating Bath; | | |
| $NiSO_4.7H_2O$ | | 60 g |
| $NiCl_2.6H_2O$ | | 10 g |
| $CoSO_4.7H_2O$ | | 60 g |
| $CoCl_2.6HO$ | | 10 g |
| $H_3BO_3$ | | 15 g |
| Formalin | | 2 g |
| Water | | 1 lit. |
| Current Density | ; | 2.0 A/dm$^2$ |
| Temperature | ; | 40°C |
| pH | ; | 5.0 |
| Plating | ; | 2 min. 30 sec. |

The surface of the magnetic recording medium thus obtained was then copper plated under following conditions:

| | | |
|---|---|---|
| Composition of Plating Bath; | | |
| $Cu_2P_2O_7.3H_2O$ | | 94 g/l |
| $K_4P_2O_7$ | | 340 g/l |
| $NH_4OH$ | | 3.00 cc/l. |
| Lustering Agent* | | 3 cc/lit. |
| Current Density | ; | 1.5 A/dm$^2$ |
| Temperature | ; | 55°C |
| pH | ; | 8.7 |
| Plating Time | ; | suitably selected |

*Sodium lauryl sulfate

After that, rhodium plating was applied to the copper plated surface under the following conditions:

| | | |
|---|---|---|
| Composition of Plating Bath; | | |
| Rh Plating Solution No. 217 | | (produced by Engelhardt Japan Ltd) |
| Current Density | ; | 1.2 A/dm$^2$ |
| pH | ; | less than 1 |
| Temperature | ; | 40°C |
| Plating Time | ; | suitably selected |

Figure 1:
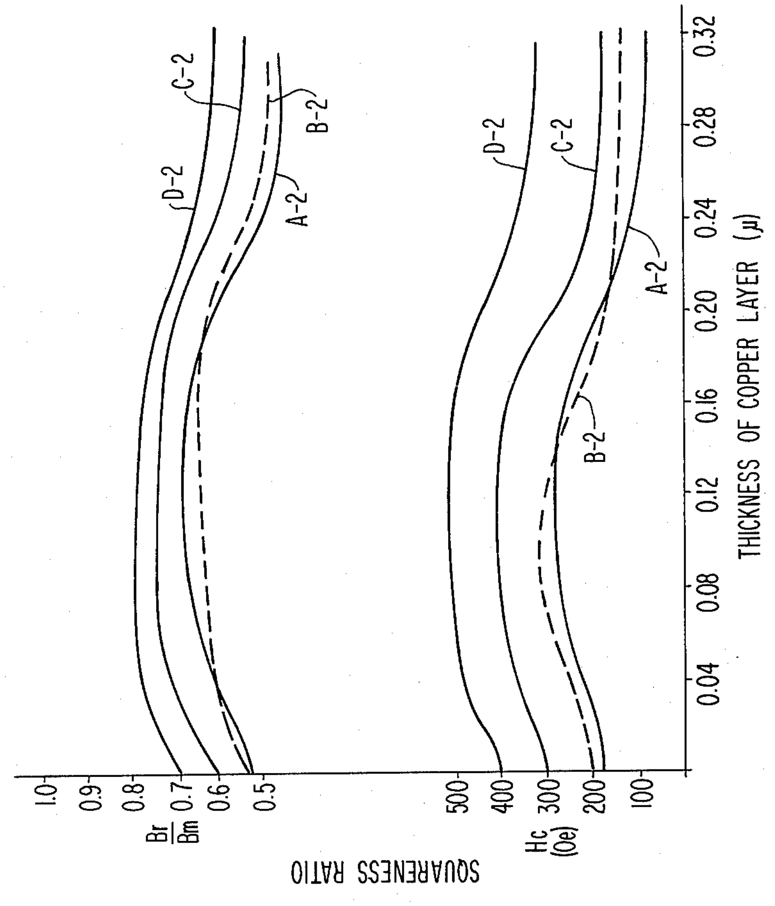
FIGS. 1 and 3 are graphs showing the relation between the squareness ratio (Br/Bm) and the thickness of the copper layer, and that between the coercive force (Hc) and the thickness of the copper layer.

The magnetic recording body thus obtained exhibited the magnetic properties as shown by curve A-2 in FIG. 1 and FIG. 2.

EXAMPLE 2

A magnetic recording body was produced under the same conditions as described in Example 1 except for the bath composition for plating the magnetic recording medium, which contained $AgNO_3$ 5 g in addition to the constituents of the plating bath used in Example 1.

The magnetic recording body thus obtained exhibited the magnetic properties shown by curve B-2 in FIGS. 1 and 2 (shown as a dotted line in FIG. 1 so that it can be easily distinguished from Curve A-2).

EXAMPLE 3

A magnetic recording body was produced under the same conditions as described in the Example 1 except for the bath composition for plating the magnetic recording medium which contained $CuSO_4.5H_2O$ 5 g in addition to the constituents of the plating bath used in Example 1.

The magnetic recording body thus produced exhibited the magnetic properties as shown by Curve C-2 in FIGS. 1 and 2.

EXAMPLE 4

A magnetic recording body was produced under the same condition as described in Example 1 except for the bath composition for plating the magnetic recording medium, which contained $NaH_2PO_2.H_2O$ 5 g in addition to the constituents of the plating bath used in Example 1.

The magnetic recording body thus produced exhibited the magnetic properties as shown by Curve D-2 in FIGS. 1 and 2.

EXAMPLE 5

A magnetic recording body was produced under the same conditions as described in Example 1 except for the bath compositions for plating the magnetic recording medium which was composed of $CoSO_4.7H_2O$ 120 g, $CoCl_2.6H_2O$ 20 g, $H_3BO_3$ 15 g, formalin 2 g and water 1 liter. The magnetic recording body thus produced exhibited the magnetic properties as shown by Curve E-2 in FIGS. 3 and 4.

EXAMPLE 6

A magnetic recording body was produced under the same conditions as described in Example 5 except for the bath composition medium, which contained $Hg(NO_3)_2.2H_2O$ 5 g in addition to the constituents of the plating bath used in Example 5.

Figure 3:
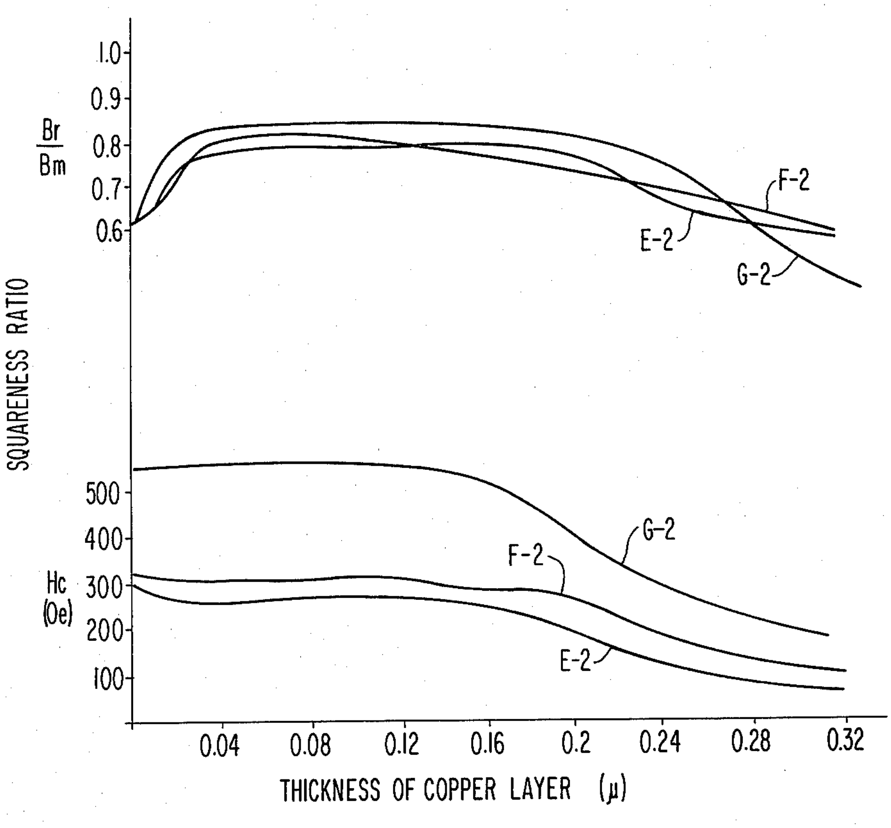

The magnetic recording body thus produced exhibited the magnetic properties as shown by Curve F-2 in FIGS. 3 and 4.

EXAMPLE 7

A magnetic recording body was produced under the same conditions as described in Example 1 except for the chemical plating treatment which was carried out under following conditions:

| | | |
|---|---|---|
| Base Sheet | ; | alumina sheet cleaned and not plated with a copper layer |
| Chemical Plating Bath Composition | ; | |
| $CoSO_4.7H_2O$ | | 14 g |
| $NaH_2PO_2.H_2O$ | | 20 g |
| $Na_2C_4H_4O_7.H_2O$ | | 100 g |
| Water | | 1 lit. |
| Temperature | ; | 80°C |
| pH | ; | 8.5 (adjusted with NaOH) |
| Plating Time | ; | 10 min. |

The magnetic recording body thus produced exhibited the magnetic properties as shown by Curve G-2 in FIGS. 3 and 4.

In FIGS. 1 – 4 comparison samples prepared using the same procedures as described above using only a rhodium plated layer on the magnetic layer are all designated A-1, B-1, C-1, etc., throughout while the samples in which a copper layer was plated on the magnetic layer and then a rhodium layer was plated on the copper layer are designated A-2, B-2, C-2, etc., throughout.

FIG. 1 and FIG. 3 show the magnetic properties of the magnetic recording bodies having a rhodium layer of a thickness of 0.1 $\mu$, whereas FIG. 2 and FIG. 4 show the intensity of reflected light of the magnetic recording bodies which were produced by plating the rhodium layer directly on the magnetic recording medium. The results of the atomic light absorption analysis confirmed that the main component of the magnetic recording medium in the Examples 5, 6, and 7 was cobalt.

It will be apparent from FIG. 1 and FIG. 3 that excellent magnetic properties, especially the squareness ratio, of the magnetic recording body were obtained when the thickness of the copper layer was not more than 0.2 $\mu$ and where the plating bath composed mainly of Ni-Co compound and containing small amount of copper or a phosphorus compound was used. The magnetic properties were decreased when the thickness of the copper film exceeded 0.2 $\mu$.

It will be also apparent from FIG. 2 and FIG. 4 that a lustrous and mirror like smoothness and a high reflecting light intensity was obtained by putting the copper layer (the difference in brightness being related to the presence of the copper layer) between the magnetic recording medium and the rhodium layer.

The effect of the rhodium layer was remarkable when the thickness thereof exceeded 0.02 $\mu$. Where lamp 1 is operated at 8 volts, a smoothness such that the light reflected gives rise to an output of 6 volts at the photoelectric cell 2 is preferred.

That the existence of the rhodium layer results in excellent weather resistance, wear resistance, corrosion resistance and a high hardness can be understood from the results presented hereinbefore.

The application of the magnetic recording medium layer on the base support can be carried out by either an electric plating treatment or a chemical plating treatment, as is described in the Examples.

The most preferred aspect of this invention is characterized in that the magnetic recording medium is applied on the base support surface by a plating treatment using a plating bath composed mainly of a nickel compound and a cobalt compound and containing small amount of a copper, silver, mercury, or phosphorus compound.

The copper, silver, or mercury are generally used at a level of about 0.02 – 10% by weight and the phosphorus in an amount of about 0.1 to 10% by weight. The first protecting layer of copper film of 0.1 $\mu$ thickness is then applied on the surface of the plated magnetic recording medium layer and the second protecting layer of a rhodium film of 0.1 to 0.5 $\mu$ thickness is further applied on the first protecting layer. The resulting magnetic recording body exhibits excellent magnetic properties, a mirror like smoothness, and minimum space loss due to the protecting layers. An activating treatment as described in U.S. Pat. Nos. 3,150,939 and 3,202,529 utilizing a palladium solution, a gold solution or a platinum solution can be employed, if desired.

The magnetic recording body of this invention is applicable to use as magnetic tapes, discs, drums and cards with these embodiments having excellent magnetic properties.

While this invention has been described with reference to particular embodiments thereof, it will be understood that numerous changes and modifications can be made therein by those skilled in the art without actually departing from the scope of this invention.

Therefore, the appended claims are intended to cover all such equivalent variations as coming within the true spirit and scope of this invention.

What is claimed is:

1. A magnetic recording element comprising a nonmagnetic base support having thereon a magnetic recording medium layer composed predominantly of cobalt or a cobalt-nickel alloy, a first protecting layer of copper having a thickness of less than 0.2 micron on said magnetic recording medium layer, and a second protecting layer of rhodium having a thickness of more than 0.01 micron on said first protecting layer.

2. The magnetic recording element of claim 1, wherein said magnetic recording medium contains a small amount of copper, silver mercury, or phosphorus.

3. The magnetic recording element of claim 2, wherein said magnetic recording medium layer contains 0.02 to 10 wt.% of copper, silver or mercury.

4. The magnetic recording element of claim 2, wherein said magnetic recording medium layer contains 0.1 to 10 wt.% of phosphorus.

5. The magnetic recording element of claim 1, wherein said magnetic recording medium layer has a thickness of 0.01 to 5 microns.

6. The magnetic recording element of claim 1, wherein said first protecting layer of copper has a thickness of 0.01 to 0.2 micron.

7. The magnetic recording element of claim 1, wherein said second protecting layer of rhodium has a thickness of 0.01 to 2 microns.

8. The magnetic recording medium of claim 1, wherein said magnetic recording medium layer has a thickness of 0.1 to 5 microns, said first protecting layer of copper has a thickness of 0.01 to 0.2 microns and said second protecting layer of rhodium has a thickness of 0.01 to 2 microns.

* * * * *